US012804724B2

(12) United States Patent
Sha et al.

(10) Patent No.: US 12,804,724 B2
(45) Date of Patent: Nov. 17, 2026

(54) RANDOM ACCESS RESOURCE DETERMINATION METHOD. RANDOM ACCESS METHOD, COMMUNICATION NODE, AND MEDIUM

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Li Niu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 249 days.

(21) Appl. No.: 18/718,765

(22) PCT Filed: Apr. 27, 2022

(86) PCT No.: PCT/CN2022/089602

§ 371 (c)(1),
(2) Date: Jun. 11, 2024

(87) PCT Pub. No.: WO2023/108977

PCT Pub. Date: Jun. 22, 2023

(65) Prior Publication Data

US 2025/0056617 A1 Feb. 13, 2025

(30) Foreign Application Priority Data

Dec. 16, 2021 (CN) ......................... 202111561807.9

(51) Int. Cl.
*H04W 74/0833* (2024.01)
*H04B 17/318* (2015.01)

(52) U.S. Cl.
CPC ...... *H04W 74/0833* (2013.01); *H04B 17/328* (2023.05)

(58) Field of Classification Search
CPC ........................... H04W 74/0883; H04L 12/28
See application file for complete search history.

(56) References Cited

U.S. PATENT DOCUMENTS

2016/0157218 A1* 6/2016 Nam .................... H04B 7/0639 370/329
2018/0242365 A1 8/2018 Rathonyi et al.
(Continued)

FOREIGN PATENT DOCUMENTS

CN 107734667 A 2/2018
CN 110351833 A 10/2019
(Continued)

OTHER PUBLICATIONS

International Search Report and Written Opinion for International Application No. PCT/CN2022/089602, mailed Jul. 22, 2022.
(Continued)

*Primary Examiner* — Dang T Ton
(74) *Attorney, Agent, or Firm* — Vivacqua Crane, PLLC

(57) ABSTRACT

A random access resource determination method, a random access method, a communication node, and a medium are disclosed. The method may include determining at least one coverage enhancement level for at least one carrier of the first communication node, with each of the at least one coverage enhancement level corresponding to a respective one of the at least one carrier; determining a target coverage enhancement level based on the determined at least one coverage enhancement level; selecting a carrier from the at least one carrier according to the target coverage enhancement level; and selecting the random-access resource on the selected carrier based on the coverage enhancement level of the selected carrier.

19 Claims, 6 Drawing Sheets

(56) References Cited

U.S. PATENT DOCUMENTS

| | | | | |
|---|---|---|---|---|
| 2019/0223212 | A1 | 7/2019 | Xiao et al. | |
| 2020/0015283 | A1 | 1/2020 | Li et al. | |
| 2021/0136826 | A1 | 5/2021 | Chang et al. | |
| 2022/0046714 | A1* | 2/2022 | Zhou | H04W 74/0833 |
| 2024/0251446 | A1* | 7/2024 | Prasad | H04W 74/004 |

FOREIGN PATENT DOCUMENTS

| | | | |
|---|---|---|---|
| CN | 109792768 | B | 12/2020 |
| EP | 22905745 | | 2/2025 |
| WO | WO 2020/220477 | A1 | 11/2020 |

OTHER PUBLICATIONS

[No Author Listed], Further discussion on enhanced paging carrier election and NPRACH carrier selection. Spreadtrum Communications, IGPP TSG-RAN WG2 Meeting #114-e R2-2105544, May 11, 2021; 10 pages.
Extended European Search Report for European Application No. 22905745.0, dated Feb. 20, 2025.
[No Author Listed], Xp3gpp: "ETSI TS 136 321 V16.6.0 1,2, H04W24/08 (Oct. 2021)". 3GPP TS 36.321 version 16.6.0 Release 16. Oct. 6, 2021:18-24.
[No Author Listed], Offline discussion on the issue for Random Access on multicarrier for Nb-Iot. 3GPP TSG-RAN WG2 Meeting #116 electronic, Electronic Meeting, Nov. 1-12, 2021; R2-2111392:1-9.

* cited by examiner

RANDOM ACCESS RESOURCE DETERMINATION METHOD. RANDOM ACCESS METHOD, COMMUNICATION NODE, AND MEDIUM

CROSS-REFERENCE TO RELATED APPLICATION

This application is a national stage filing under 35 U.S.C. § 371 of international application number PCT/CN2022/089602, filed Apr. 27, 2022, which claims priority to Chinese patent application No. 202111561807.9 filed Dec. 16, 2021. The contents of these applications are incorporated herein by reference in their entirety.

TECHNICAL FIELD

The present disclosure relates to the technical field of telecommunication, and in particular to a method for determining a random-access resource, a method for random access, a communication node, and a medium.

BACKGROUND

In wireless communication systems supporting multi-carrier random access, such as narrowband Internet of Things (NB-IoT) wireless access technology, the uplink interference of different carriers is different, and the uplink access performance of the same User Equipment (UE) on different carriers will be different. In the wireless communication system, UE measures the downlink signal of the residing carrier, and obtains the downlink channel quality, which can't reflect the uplink interference of different uplink carriers. Hence, it is not possible to select a suitable random-access resource for the uplink random-access carrier based on the downlink channel quality of the residing carrier.

SUMMARY

Provided are a method for determining a random-access resource, a device, a communication node, and a storage medium in some embodiments of the present disclosure.

According to an embodiment, a method for determining a random-access resource is provided. The method is applied to a first communication node. The method may include: determining at least one coverage enhancement level for at least one carrier of the first communication node, with each of the at least one coverage enhancement level corresponding to a respective one of the at least one carrier; determining a target coverage enhancement level based on the determined at least one coverage enhancement level; selecting a carrier from the at least one carrier according to the target coverage enhancement level; and selecting the random access resource on the selected carrier based on the coverage enhancement level of the selected carrier.

According to an embodiment, a method for random access is provided. The method is applied to a second communication node. The method may include, configuring a parameter value for determining a coverage enhancement level for a first communication node; and performing random access based on a random-access resource selected by the first communication node; where the random-access resource is selected by the first communication node based on the parameter value.

According to an embodiment, a first communication node is provided. The first communication node may include, at least one processor; and a storage device storing at least one program thereon, which when executed by the at least one processor, causes the at least one processor to carry out the method for determining a random-access resource as described above.

According to an embodiment, a second communication node is provided. The second communication node may include, at least one processor; and a storage device storing at least one program thereon, which when executed by the at least one processor, causes the at least one processor to carry out the method for random access as described above.

According to an embodiment, a storage medium is provided. The storage medium stores a computer program which, when executed by a processor, causes the processor to carry out any one of the methods as described above.

With regard to the above embodiments and other aspects of the present disclosure and their implementations, more illustrations are provided in the attached drawings, detailed description and claims.

DETAILED DESCRIPTION

Some embodiments of the present disclosure will be described with details below with reference to the accompanying drawings in order to illustrate the purpose, technical scheme and advantages of the present disclosure. It should be noted that various embodiments in the present disclosure and the features in the embodiments can be combined with each other without conflict.

The steps as shown in the flowchart of the drawings can be performed in a computer system such as a set of computer-executable instructions. Furthermore, in some cases, the steps shown or described may be performed in a different order than the logical order shown in the flowcharts.

Figure 1:
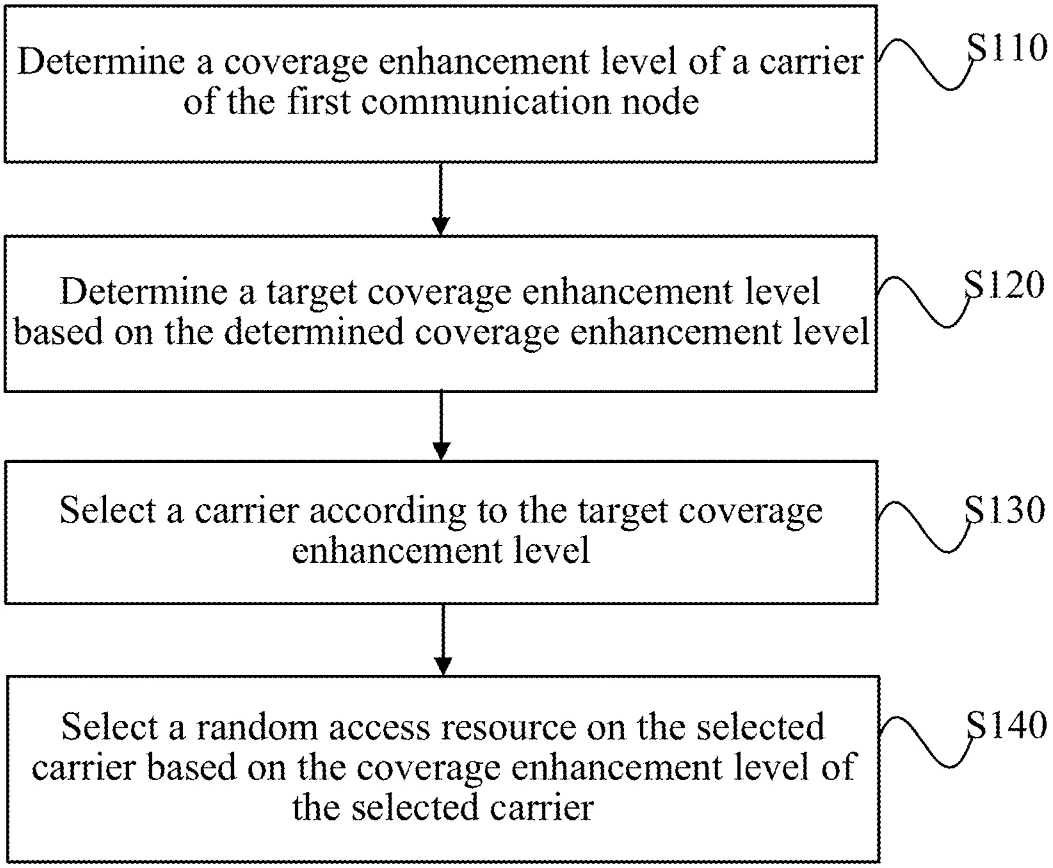
FIG. 1 depicts a flowchart showing a method for determining a random-access resource according to an embodiment of the present disclosure.

FIG. 1 depicts a flowchart showing a method for determining a random-access resource according to an embodiment of the present disclosure. The method is applicable to the selection of random-access resources. The method can be performed by a device for determining a random-access resource. The device can be implemented by one or more of software and hardware and integrated into a first communication node. The first communication node may be a user equipment. The first communication node is in a communicative connection with a second communication node. The second communication node may be a base station.

In a multi-carrier network, an anchor carrier carrying Narrowband Physical Random Access Channel (NPRACH) resources and several non-anchor carriers are generally configured. At the same time, NPRACH resources with multiple coverage enhancement levels are generally configured. A weight for the UE to select the anchor carrier PRACH resources is configured for each coverage enhancement level.

When selecting the NPRACH resource, the UE first determines the coverage enhancement level based on the comparison between the measured value of Reference Signal Receiving Power (RSRP) and the RSRP threshold corresponding to the coverage enhancement level, and then determines whether to select the anchor carrier or a non-Anchor carrier based on the weight of the anchor carrier selected by the PRACH resource of the coverage enhancement level which the UE is at. If a non-anchor carrier is selected, a carrier is randomly selected from a set of non-anchor carriers configured with the NPRACH resources of the coverage enhancement level, and then the NPRACH resources corresponding to the coverage enhancement level of the carrier are selected from the selected carrier.

Figure 2:
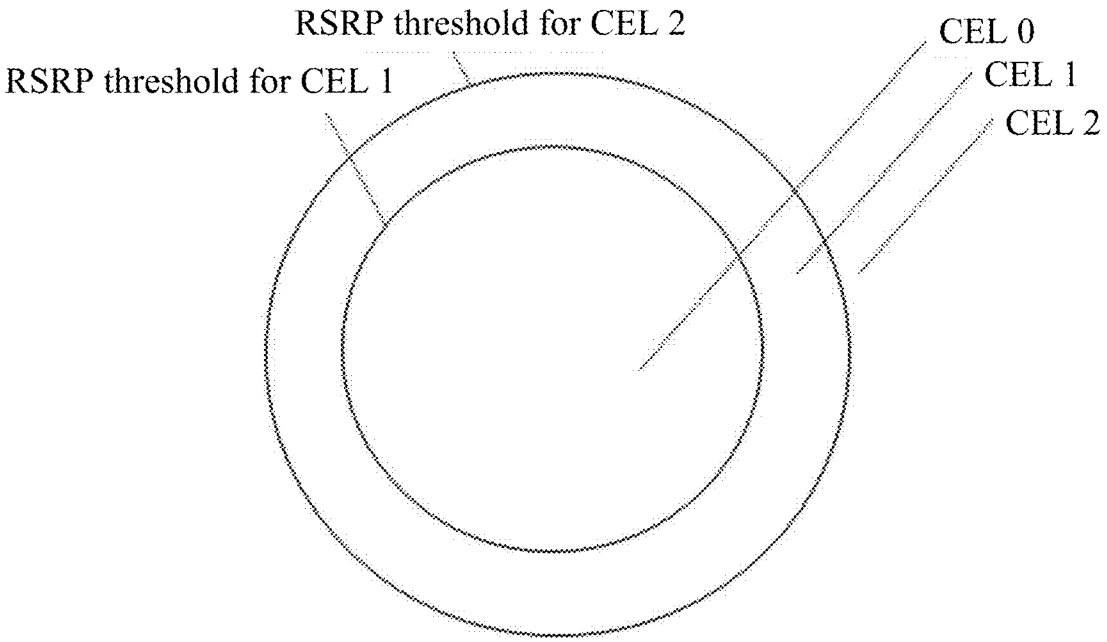
FIG. 2 depicts a schematic diagram showing a determination of a coverage enhancement level according to an embodiment of the present disclosure.

FIG. 2 depicts a schematic diagram showing a determination of a coverage enhancement level according to an embodiment of the present disclosure. As shown in FIG. 2, the coverage area of a cell is divided into ranges corresponding to three coverage enhancement levels by RSRP thresholds of two coverage enhancement levels (RSRP threshold for CEL1, and RSRP threshold for CEL2). The three coverage enhancement levels are CEL0 (i.e. the third coverage enhancement level), CEL1 (i.e. the first coverage enhancement level), and CEL2 (i.e. the second coverage enhancement level). The range of CEL2 is the cell range where the measured value of RSRP is less than RSRP threshold for CEL2. The range of CEL1 is the cell range where the measured value of RSRP is greater than or equal to RSRP threshold for CEL2, and is less than RSRP threshold for CEL1. The range of CEL0 is the cell range where the measured value of RSRP is greater than or equal to RSRP threshold for CEL1. The greater the coverage enhancement level of the cell, the greater the repetition times of the uplink transmission of the UE (the greater the radio resource overhead).

In this way, the difference in uplink interference between the anchor carrier and the non-anchor carrier, results in the difference in the uplink coverage areas. For example, when the coverage area of the non-anchor carrier is smaller than that of the anchor carrier (that is, the uplink interference of the non-anchor carrier is larger than that of the anchor carrier), if the RSRP threshold of the coverage enhancement level is configured according to the coverage area of the anchor carrier, the NPRACH performance of the non-anchor carrier cannot be guaranteed. If the RSRP threshold of the coverage enhancement level is configured according to the coverage range of the non-Anchor carrier, the wireless resources of the anchor carrier will be wasted.

In order to select an appropriate random-access resource, a method for determining a random-access resource is provided according to an embodiment of the present disclosure. As shown in FIG. 1, the method includes the following steps.

At operation S110, a coverage enhancement level of a carrier of the first communication node is determined.

The coverage enhancement level determined in this step can be employed to determine the target coverage enhancement level of the carrier of the first communication node.

In an embodiment, the determined coverage enhancement level includes the coverage enhancement level of an anchor carrier.

In an embodiment, the determined coverage enhancement levels are the coverage enhancement levels of all carriers.

The means of determining the coverage enhancement level for anchor carriers and non-anchor carriers can be different, and are not limited here.

In an embodiment, when the coverage enhancement level of the anchor carrier is determined, the RSRP value of the anchor carrier can be compared with the threshold of the first coverage enhancement level and the threshold of the second coverage enhancement level to determine the coverage enhancement level of the anchor carrier.

In some examples, when the RSRP value of the anchor carrier is less than the first coverage enhancement level, the coverage enhancement level of the anchor carrier is determined as the third coverage enhancement level. When the RSRP value of the anchor carrier is greater than the first coverage enhancement level and less than the second coverage enhancement level, the coverage enhancement level of the anchor carrier is determined as the first coverage enhancement level. When the RSRP value of the anchor carrier is greater than the second coverage enhancement level, the coverage enhancement level of the anchor carrier is determined as the second coverage enhancement level.

The threshold of the first coverage enhancement level may be the RSRP threshold of the first coverage enhancement level. The threshold of the second coverage enhancement level may be the RSRP threshold of the second coverage enhancement level.

In an embodiment, when the coverage enhancement levels of the non-anchor carriers are determined, the RSRP value of the non-anchor carrier can be determined based on the RSRP value of the anchor carrier and an offset of the narrow-band reference signal (NRS) power of the non-anchor carrier with respect to that of the anchor carrier. Then, the coverage enhancement level of the non-anchor carrier can be determined based on the comparisons between the RSRP value of the non-anchor carrier and each of the threshold of the first coverage enhancement level, and the threshold of the second coverage enhancement level.

In one embodiment, a third coverage enhancement level can be configured for each of or part of the non-anchor carriers. Alternatively, a third coverage enhancement level, i.e., threshold of CEL0, can be configured for all the non-anchor carriers, and then the coverage enhancement level of the non-anchor carriers can be determined based on the comparison between the RSRP value and the threshold of the third coverage enhancement level. If it is determined that the coverage enhancement level of the non-anchor carrier is not the third coverage enhancement level according to the comparison between the RSRP value and the threshold of the third coverage enhancement level, the coverage enhancement level of the non-anchor carrier can be determined based on the threshold of the first coverage enhancement level and the threshold of the second coverage enhancement level. When the coverage enhancement level of the non-anchor carrier is determined to be the third coverage enhancement level, based on the threshold of the first coverage enhancement level and the threshold of the second coverage enhancement level, the third coverage enhancement level can be adjusted. For example, the third coverage enhancement level is adjusted to the first coverage enhancement level. In the present disclosure, the third coverage enhancement level can also be called the 0th coverage enhancement level, corresponding to CEL0.

In an embodiment, it is possible to introduce an uplink coverage decision threshold for a non-anchor carrier. A determination as to whether the coverage enhancement level of the non-anchor carrier is the third coverage enhancement level can be made, based on the RSRP value and the uplink coverage decision threshold. If it is determined that the coverage enhancement level of the non-anchor carrier is not the third coverage enhancement level, the coverage enhancement level of the non-anchor carrier is determined based on the threshold of the first coverage enhancement level and the threshold of the second coverage enhancement level. If the coverage enhancement level of the non-anchor carrier is determined to be the third coverage enhancement level based on the threshold of the first coverage enhancement level and the threshold of the second coverage enhancement level, the third coverage enhancement level can be adjusted. For example, the third coverage enhancement level can be adjusted to be identical to the first coverage enhancement level. Alternatively, the coverage enhancement levels of the non-anchor carriers determined based on the threshold of the first coverage enhancement level and the threshold of the second coverage enhancement level are increased by one level or to the highest level. If it is determined that the coverage enhancement level of a non-anchor carrier is the first or second coverage enhancement level based on the threshold of the first coverage enhancement level, the coverage level of the non-anchor carrier is not adjusted.

In this embodiment, one or more non-anchor carriers may be provided. The coverage enhancement levels of the non-anchor carriers can be the same, different, or partially the same.

At operation S120, a target coverage enhancement level is determined based on the determined coverage enhancement level.

In this operation, the coverage enhancement level of the anchor carrier is determined as the target coverage enhancement level. Alternatively, the lowest coverage enhancement level among coverage enhancement levels of all carriers is determined as the target coverage enhancement level.

At operation S130, a carrier is selected according to the target coverage enhancement level.

After the target coverage enhancement level is determined, carriers configured with random access resources of the target coverage enhancement level can be selected to form a set of carriers. Then, a carrier is selected from the set of carriers. There are no restrictions on the means for selection. For example, a selection for the anchor carrier or a non-anchor carrier can be determined based on the weight of the anchor carrier. If a non-anchor carrier is to be selected, any one of the non-anchor carriers can be selected randomly.

At operation S140, a random-access resource is selected on the selected carrier based on the coverage enhancement level of the selected carrier.

After the carrier is selected, the coverage enhancement level of the selected carrier can be determined. For the technical means of determining the coverage enhancement level, please refer to the technical means of determining the coverage enhancement level as described in S110, which is not limited here.

After the carrier is selected, a random-access resource is selected for the selected carrier based on the coverage enhancement level of the selected carrier in this operation. When the random-access resource is selected based on the coverage enhancement level of the selected carrier, the random-access resource corresponding to the coverage enhancement level that is the same as the coverage enhancement level of the selected carrier can be selected for the selected carrier. In some examples, if the coverage enhancement level of the selected carrier is 1, a random-access resource with the coverage enhancement level of 1 on the selected carrier is selected.

The selected random-access resource may be an NPRACH resource.

According to an embodiment of the present disclosure, a method for determining a random-access resource is provided. The method includes, determining a target coverage enhancement level, selecting a carrier, and selecting a random-access resource on the selected carrier based on the coverage enhancement level of the selected carrier. In this way, the accuracy of the selected random-access resource is improved, and random access can be completed based on the selected random-access resource.

On the basis of the above embodiments, variant embodiments of the above embodiments are proposed. It should be noted that, only the differences from the above embodiments are described in the variant embodiments for brevity of description.

In an embodiment, the carriers include one anchor carrier, and at least one non-anchor carrier each having an identical or different offset from one another, with respect to the narrowband reference signal (NRS) power of the anchor carrier. The RSRP value of a non-anchor carrier is determined as discussed below.

The RSRP value of a non-anchor carrier is determined according to the RSRP value of the anchor carrier and the power offset of the non-anchor carrier relative to the NRS power of the anchor carrier.

In an embodiment, determining the coverage enhancement level of a carrier includes:

determining the coverage enhancement level of the carrier according to the RSRP value of the carrier and the first RSRP threshold of the coverage enhancement level.

The first RSRP threshold includes a threshold of a first coverage enhancement level and a threshold of a second coverage enhancement level. The threshold of the first coverage enhancement level is greater than the threshold of the second coverage enhancement level.

The RSRP value of the anchor carrier can be measured by the first communication node. In this embodiment, the RSRP values of the non-anchor carriers are determined based on the RSRP value of the anchor carrier to obtain the coverage enhancement levels of the non-anchor carriers.

The RSRP value of a non-anchor carrier can equal the RSRP value of the anchor carrier plus the NRS power offset of the non-anchor carrier.

The coverage enhancement level of the anchor carrier can be determined based on the comparison between the measured RSRP value and the first RSRP threshold. The coverage enhancement level of a non-anchor carrier can be determined based on the comparison between the determined RSRP value of the non-anchor carrier and the first RSRP threshold.

The threshold of the first coverage enhancement level may be greater than the threshold of the second coverage enhancement level. The threshold of the third coverage enhancement level may be greater than the threshold of the first coverage enhancement level.

In an embodiment, selecting a carrier according to the target coverage enhancement level includes:

selecting a carrier from a set of carriers configured with random access resources corresponding to the target coverage enhancement level. The target coverage enhancement level is the coverage enhancement level of an anchor carrier or the lowest coverage enhancement level among coverage enhancement levels of all carriers.

In this embodiment, it is possible to determine whether to select an anchor carrier or a non-anchor carrier based on the weight of the anchor carrier.

When a carrier is selected from the non-anchor carriers, it is possible to determine a set of carriers configured with random access resources of the target coverage enhancement level, and a carrier is selected from the set of carriers. If the carrier is selected from the anchor carrier, the anchor carrier is determined as the selected carrier.

When a carrier is selected from the set of non-anchor carriers, one carrier in the set of carriers configured with the random-access resource of the target coverage enhancement level can be randomly selected as the selected carrier.

In some examples, the coverage enhancement level (CEL) can be determined separately for each carrier based on the RSRP value.

The UE calculates the RSRP value of a non-anchor carrier based on the measured RSRP value of the anchor carrier and the NRS power offset of the non-anchor carrier (nrs-PowerOffsetNonAnchor) with respect to the anchor carrier. For example, for each non-anchor carrier, the RSRP value=the RSRP value of the anchor carrier+nrs-PowerOffsetNonAnchor.

The UE calculates the CEL of each carrier based on the comparison between the RSRP value of each carrier and the RSRP threshold of the coverage enhancement level, i.e., the first RSRP threshold (RSRP threshold for CEL1, RSRP threshold for CEL2), and then selects a set of carriers each configured with NPRACH resources corresponding to the target coverage enhancement level on each carrier. The target coverage enhancement level may be the coverage enhancement level of the anchor carrier.

Figure 3:
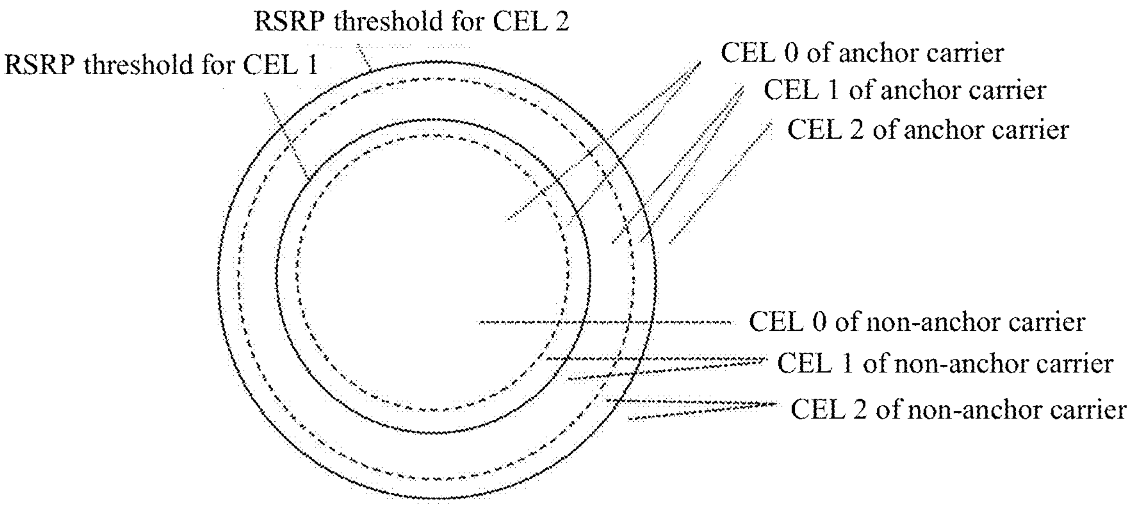
FIG. 3 depicts a schematic diagram showing a determination of a coverage enhancement level according to another embodiment of the present disclosure.

FIG. 3 depicts another schematic diagram showing the determination of the coverage enhancement level according to an embodiment of the present disclosure. The RSRP value of each carrier is compared with the RSRP threshold of the coverage enhancement level (RSRP threshold for CEL1, and RSRP threshold for CEL2), and the CEL of each carrier is calculated.

The UE selects a carrier from the set of carriers according to an existing rule (for example, a determination as to whether to select an anchor carrier or a non-anchor carrier is made according to the anchor carrier selection weight corresponding to the anchor carrier CEL of the NPRACH resource). If a non-anchor carrier is selected, a carrier is randomly selected from the set of non-anchor carriers. The NPRACH resource is selected for the selected carrier according to the CEL of the carrier.

When the times of attempt for random access of NPRACH resources based on the selected coverage enhancement level reaches the maximum number of times (i.e., a threshold number is set) such that the coverage enhancement level shall increase, the NPRACH resource corresponding to the maximum coverage enhancement level is selected directly. Alternatively, when the coverage enhancement level does not reach the maximum coverage level, the coverage enhancement level of the anchor/non-anchor carriers simultaneously increases by one level (the coverage enhancement level is increased by one). Then, a carrier and the NPRACH resource are selected according to the method as discussed above.

In an embodiment, the reselection of carrier is necessary every time the NPRACH resource is selected.

In an embodiment, every time the NPRACH resource is selected, the NPRACH resource can be selected on the original carrier. When the number of times of attempts for random access based on the NPRACH resource corresponding to the current coverage enhancement level reaches the maximum number of times, the selected NPRACH resource can be the NPRACH resource with an increased coverage enhancement level. For example, for a subsequent selection of the NPRACH resource, the coverage enhancement level of the selected NPRACH resource is increased by 1.

Figure 4:
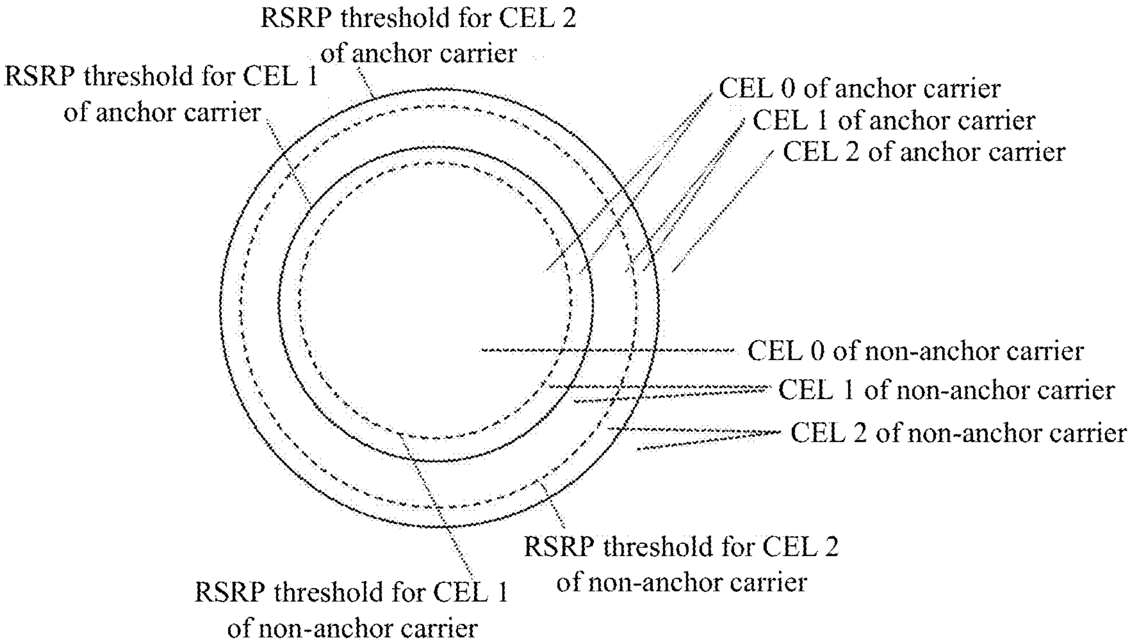
FIG. 4 depicts a schematic diagram showing a determination of a coverage enhancement level according to another embodiment of the present disclosure.

FIG. 4 depicts a schematic diagram showing another determination of coverage enhancement level according to an embodiment of the present disclosure. In this embodiment, the RSRP value of each carrier is compared with the RSRP threshold of the coverage enhancement level (RSRP threshold for CEL1, RSRP threshold for CEL2). The CEL of each carrier is calculated. The effect is equivalent to adjusting the RSRP threshold of each non-anchor carrier to the RSRP threshold of the coverage enhancement level (RSRP threshold for CEL1, RSRP threshold for CEL2)-nrs-PowerOffsetNonAnchor. Then, the measured RSRP value of the anchor carrier is compared with the RSRP threshold for CEL decision of each carrier.

In FIG. 4, RSRP threshold of coverage enhancement level of a non-anchor carrier=RSRP threshold of coverage enhancement level of the anchor carrier (RSRP threshold for CEL1, RSRP threshold for CEL2)-nrs-PowerOffsetNonAnchor. The cell measured RSRP value is compared with the RSRP threshold of the coverage enhancement level of each carrier, and the CEL of each non-anchor carrier is calculated.

In an embodiment, determining the coverage enhancement level of a carrier includes, determining the coverage enhancement level of the non-anchor carrier according to the RSRP value of the anchor carrier and the second RSRP threshold of the coverage enhancement level.

In an implementation, the second RSRP threshold includes a threshold of the first coverage enhancement level, a threshold of the second coverage enhancement level, and a threshold of the third coverage enhancement level. The level values of the third coverage enhancement level are lower than the level value of the first coverage enhancement level which is in turn lower than the level value of the second coverage enhancement level. Each non-anchor carrier corresponds to a respective threshold of the third coverage enhancement level. Alternatively, all non-anchor carriers correspond to a threshold of the third coverage enhancement level. The threshold of the third coverage enhancement level is lower than the threshold of the first coverage enhancement level which is in turn lower than the threshold of the second coverage enhancement level.

The threshold of the first coverage enhancement level may be the threshold for judging CEL1. The threshold of the second coverage enhancement level may be the threshold for judging CEL2. The threshold of the third coverage enhancement level may be the threshold for judging CEL0.

When determining the coverage enhancement level of a non-anchor carrier, the coverage enhancement level of the non-anchor carrier can be determined based on the threshold of the third coverage enhancement level. If the coverage enhancement level of the non-anchor carrier is determined to be the third coverage enhancement level based on the threshold of the third coverage enhancement level, the coverage enhancement level of the non-anchor carrier is determined to be the third coverage enhancement level.

If it is determined that the coverage enhancement level of the non-anchor carrier is not the third coverage enhancement level based on the third coverage enhancement level, the coverage enhancement level is determined based on the threshold of the first coverage enhancement level and the threshold of the second coverage enhancement level.

In an embodiment, when the coverage enhancement level of a non-anchor carrier is determined not to be the third coverage enhancement level based on the threshold of the third coverage enhancement level, and the coverage enhancement level of the non-anchor carrier is determined to be the third coverage enhancement level based on the threshold of the first coverage enhancement level, the coverage enhancement level of the non-anchor carrier is adjusted. If it is determined that the coverage enhancement level of a non-anchor carrier is the first or second coverage enhancement level based on the threshold of the first coverage enhancement level, the coverage level of the non-anchor carrier is not adjusted.

Here, the adjustment method is not limited. For example, if it is determined that the coverage enhancement level is to be increased (or, raised), the number of increased levels is not limited.

The coverage enhancement level of the anchor carrier is determined based on the threshold of the first coverage enhancement level and the threshold of the second coverage enhancement level.

In an embodiment, adjusting the coverage enhancement level of the non-anchor carrier includes:

adjusting the coverage enhancement level of the non-anchor carrier to be the first coverage enhancement level.

In an embodiment, the selected carrier is selected from the set of carriers determined by the target coverage enhancement level that is the lowest coverage enhancement level among coverage enhancement levels of all carriers.

In some examples, a threshold for CEL0 (i.e., the threshold of the third coverage enhancement level, also known as the RSRP threshold of the third coverage enhancement level) is configured for each or part of the non-anchor carriers. Different non-anchor carriers correspond to different thresholds for CEL0. Alternatively, all non-anchor carriers are configured with the same threshold for CEL0.

Figure 5:
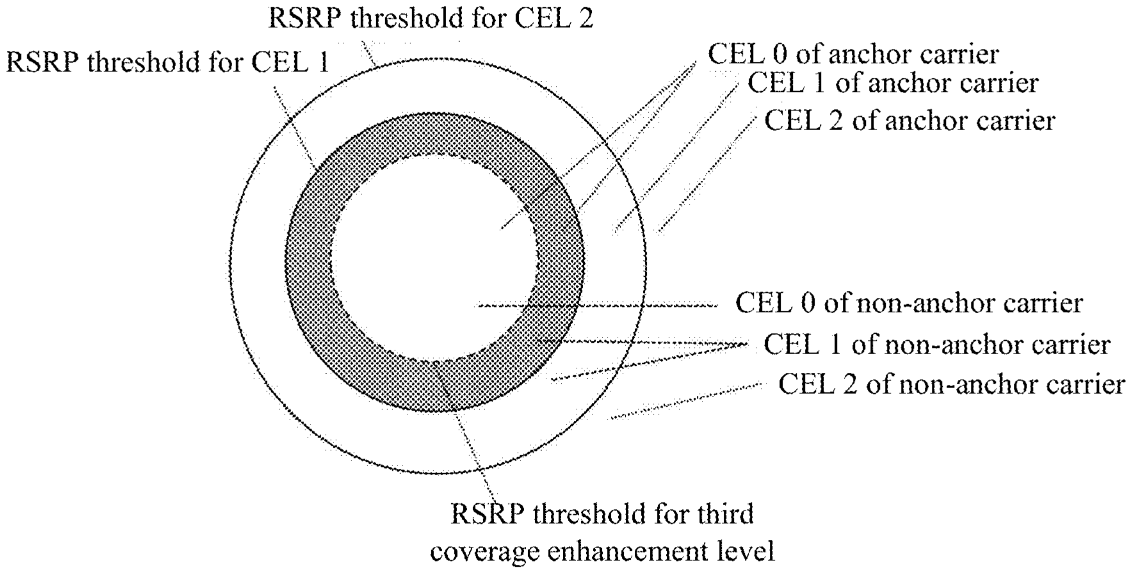
FIG. 5 depicts a schematic diagram showing a determination of a coverage enhancement level according to another embodiment of the present disclosure.

As shown in FIG. 5, an RSRP threshold for decision of CEL0 is configured for each or part of the non-anchor carriers. A determination as to whether the coverage enhancement level of the carrier is CEL0 is made by comparing the RSRP value of the anchor carrier with the RSRP threshold for decision of CEL0 for the non-anchor carrier. When the RSRP value is greater than or equal to the RSRP threshold for decision of CEL0 for the non-anchor carrier, i.e., the threshold of the third coverage enhancement level, the carrier of the UE is at CEL0. Otherwise, the CEL of the UE is determined according to the comparison between the measured value of RSRP and the RSRP threshold of the coverage enhancement level (RSRP threshold for CEL1, RSRP threshold for CEL2). If it is determined that the CEL of the non-Anchor carrier is CEL0, the CEL is automatically adjusted to CEL1. This method can flexibly adjust the coverage of CEL0 of non-anchor carriers.

NPRACH carrier selection strategy #1: UE selects the set of carriers corresponding to the lowest CEL, and then selects a carrier in the set of carriers. If the anchor carrier is in the set, the UE first determines whether to select the anchor carrier or a non-anchor carrier based on the weight of the anchor carrier of the PRACH resource of the selected coverage enhancement level. If a non-anchor carrier is to be selected, the non-anchor carrier is randomly selected from the set of non-anchor carriers. The CEL of the set of carriers can be the lowest coverage enhancement level among coverage enhancement levels of all carriers.

NPRACH carrier selection strategy #2: A determination is made as to whether to select an anchor carrier or a non-anchor carrier according to the CEL of the anchor carrier and the weight of the anchor carrier. If the UE selects an anchor carrier, then the NPRACH resource corresponding to the coverage enhancement level of the anchor carrier on the anchor carrier is selected. If a non-anchor carrier is selected, a NPRACH carrier is randomly selected from the set of non-anchor carriers configured with NPRACH resources corresponding to the target CEL on the non-anchor carriers. The target CEL can be the coverage enhancement level of the anchor carrier.

FIG. 5 depicts a schematic diagram showing the determination of coverage enhancement level according to another embodiment of the present disclosure. As shown in FIG. 5, an RSRP threshold for CEL0 decision is configured for each or part of the non-anchor carriers, or an RSRP threshold for CEL0 decision is configured for all non-anchor carriers, which is the RSRP threshold of the third coverage enhancement level to adjust the coverage of CEL0 of non-anchor carriers.

When NPRACH resource is configured for a carrier, it is ensured that the NPRACH resource with a low coverage level is configured along with the NPRACH resource with high coverage level. Alternatively, when a non-anchor carrier is to be selected, the set of carriers configured with the NPRACH resource corresponding to CEL is first selected, and then a carrier is selected from the set.

When the times of attempt for random access of NPRACH resources based on the current coverage enhancement level reaches the maximum number of times such that the coverage enhancement level shall increase, the NPRACH resource corresponding to the maximum coverage enhancement level is selected directly. Alternatively, when the coverage enhancement level does not reach the maximum coverage level, the coverage enhancement level of the anchor/non-anchor carriers simultaneously increases by one level (the coverage enhancement level is increased by one). Then, a carrier and the NPRACH resource are selected according to the method as discussed above.

In an embodiment, determining the coverage enhancement level for each carrier includes:

determining the coverage enhancement level of the non-anchor carrier according to the RSRP value of the anchor carrier and the third RSRP threshold of the coverage enhancement level.

The third RSRP threshold includes a threshold of a first coverage enhancement level, a threshold of a second coverage enhancement level, and a threshold of an uplink coverage decision. The threshold of the uplink coverage decision is utilized to determine the coverage enhancement level of a non-anchor carrier. The threshold of the uplink coverage decision is lower than the threshold of the first coverage enhancement level which is in turn lower than the threshold of the second coverage enhancement level.

The coverage enhancement level of the anchor carrier can be determined based on the threshold of the first coverage enhancement level and the threshold of the second coverage enhancement level.

The coverage enhancement level of the non-anchor carrier can be determined based on the third RSRP threshold. In some examples, it is first determined whether the coverage enhancement level of the non-anchor carrier is the third coverage level based on the comparison between the threshold of the uplink coverage decision and the measured RSRP value. If not, the coverage enhancement level of the non-anchor carrier is determined through the threshold of the first coverage enhancement level and the threshold of the second coverage enhancement level.

In an embodiment, when the coverage enhancement level of a non-anchor carrier is determined not to be the third coverage enhancement level based on the threshold of the uplink coverage decision, and the coverage enhancement level of the non-anchor carrier is determined to be the third coverage enhancement level based on the threshold of the first coverage enhancement level, the coverage enhancement level of the non-anchor carrier is adjusted.

The means of adjustment are not limited here. The adjustment can be an increase in level, and the number of increased levels is not limited.

In an embodiment, adjusting the coverage enhancement level of the non-anchor carrier includes:

- adjusting the coverage enhancement level of the non-anchor carrier to be the first coverage enhancement level.

In an embodiment, when the coverage enhancement level of a non-anchor carrier is determined not to be the third coverage enhancement level based on the threshold of the uplink coverage decision, and the coverage enhancement level of the non-anchor carrier is determined based on the threshold of the first coverage enhancement level or the threshold of the second coverage enhancement level, the coverage enhancement level of the non-anchor carrier is adjusted.

The means of adjustment are not limited here. The adjustment can be an increase in level. There is no limitation to the number of increased levels.

In an embodiment, adjusting the coverage enhancement level of the non-anchor carrier includes:

- increasing the coverage enhancement level of the non-anchor carrier by a preset number of levels; or, adjusting the coverage enhancement level of the non-anchor carrier to the maximum coverage enhancement level of the random-access resource configured by a cell.

The preset number of levels can be one or two. The maximum coverage enhancement level may be the maximum value of the coverage enhancement level. The maximum value of the coverage enhancement level is not limited and can be determined based on the practical situation.

In an embodiment, the method further includes:

- When the number of times of attempts for random access based on the selected random-access resource is greater than or equal to a preset threshold, the random access resource on the carrier with the largest coverage enhancement level is selected; or, after adjusting the coverage enhancement level of each carrier, the selection for the carrier is continued.
- When the number of times of attempts of random access by the first communication node based on the selected random-access resource reaches the preset threshold and the access is not successful, the random-access resource on the carrier with the greatest coverage enhancement level can be selected. Alternatively, the coverage enhancement level of each carrier is increased by a preset number of levels, and then the carrier selection is continued. In some examples, the maximum coverage enhancement level may be the second coverage enhancement level.

Figure 6:
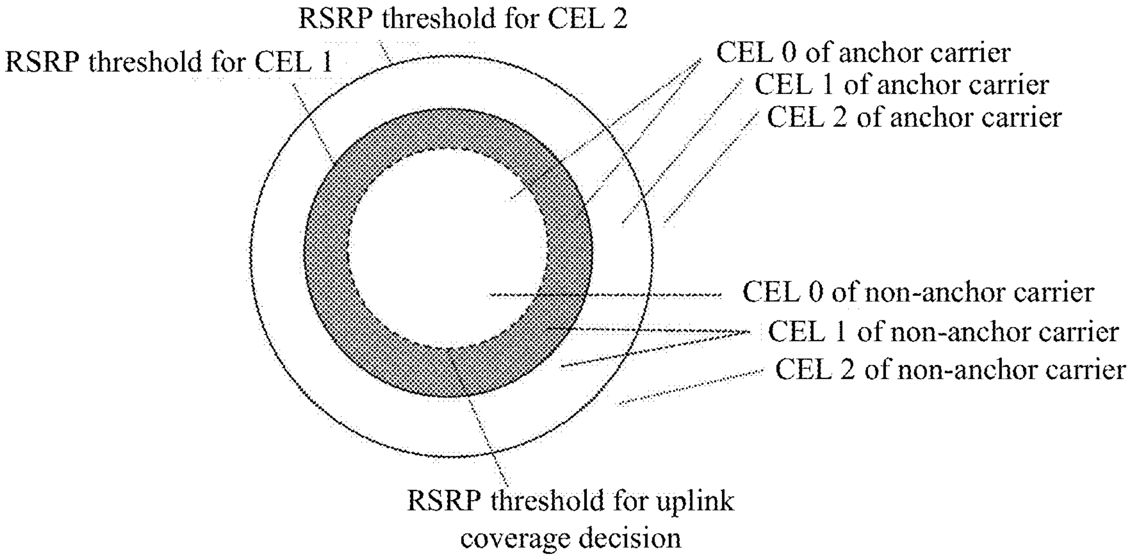
FIG. 6 depicts a schematic diagram showing a determination of a coverage enhancement level according to another embodiment of the present disclosure.
Figure 7:
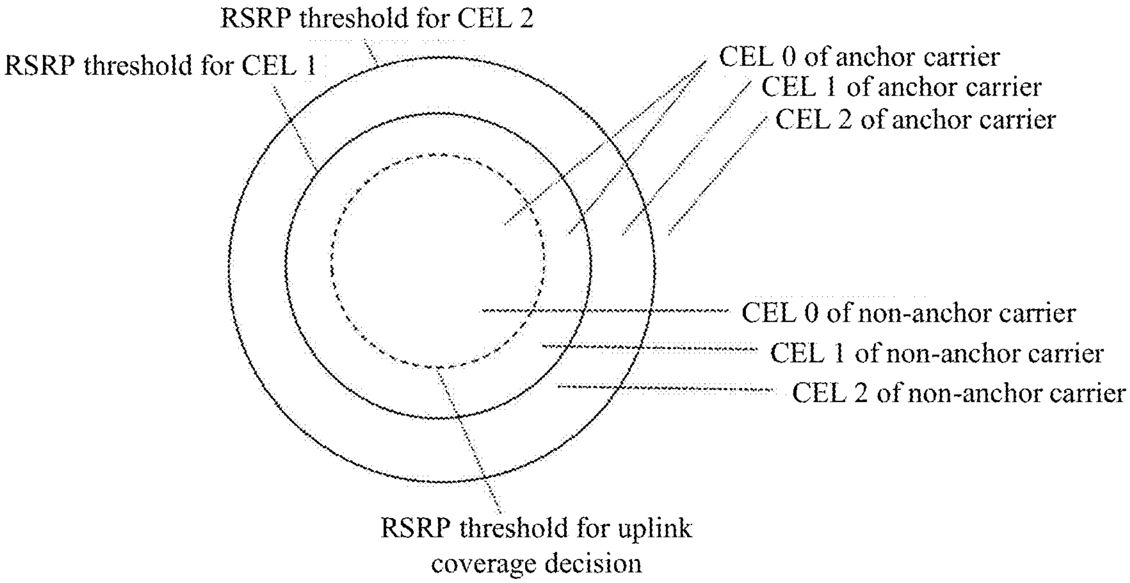
FIG. 7 depicts a schematic diagram showing a determination of a coverage enhancement level according to yet another embodiment of the present disclosure.

FIG. 6 depicts a schematic diagram showing the determination of coverage enhancement level according to yet another embodiment of the present disclosure. FIG. 7 depicts a schematic diagram showing the determination of coverage enhancement level according to yet another embodiment of the present disclosure. An additional RSRP threshold for uplink coverage decision of a non-anchor carrier (RSRP Threshold Configured), i.e., the threshold of an uplink coverage decision, also known as the RSRP threshold of the uplink coverage decision, is introduced based on the RSRP thresholds of the coverage enhancement level (RSRP threshold for CEL1, and RSRP threshold for CEL2). As shown in FIG. 6, the RSRP decision thresholds for non-anchor carriers are introduced, which only narrows the coverage of CEL0 of uplink NPRACH resource. As shown in FIG. 7, the RSRP decision thresholds for non-anchor carriers are introduced, which adjusts the coverage of CEL of all non-anchor carriers of uplink NPRACH resource.

When the NPRACH resources are selected, a decision of whether to select the anchor carrier or a non-anchor carrier is made according to the CEL of the anchor carrier and the weight of the anchor carrier. In case the UE selects the anchor carrier, the coverage enhancement level is determined by comparing the measured value of RSRP with the RSRP thresholds for the coverage enhancement levels (i.e., RSRP threshold for CEL1, and RSRP threshold for CEL2), as shown in FIG. 2. In case the UE selects a non-anchor carrier, and if the measured value of RSRP is greater than or equal to the RSRP threshold for uplink coverage decision (RSRP Threshold Configured) of the non-anchor carrier, it is considered that the UE is at the coverage enhancement level of CEL 0. Otherwise, the coverage level is automatically adjusted based on the coverage enhancement level determined by comparing the measured value of RSRP with the RSRP thresholds for the coverage enhancement levels (i.e., RSRP threshold for CEL1, and RSRP threshold for CEL2).

FIG. 6 shows a method for adjustment. When the coverage enhancement level is determined to be CEL0 through the comparison of the measured value of RSRP with the RSRP thresholds for the coverage enhancement levels (i.e., RSRP threshold for CEL1, and RSRP threshold for CEL2), and the measured value of RSRP is less than the RSRP threshold of the uplink coverage decision for the non-anchor carrier, the uplink coverage enhancement level of the non-anchor carrier is automatically adjusted to the coverage enhancement level 1. When the coverage enhancement level is determined to be coverage enhancement level 1 or 2 through the comparison between the measured value of RSRP and the RSRP thresholds for the coverage enhancement levels (i.e., RSRP threshold for CEL1, and RSRP threshold for CEL2), the uplink coverage enhancement level of the non-Anchor carrier is coverage enhancement level 1 or 2, and the coverage enhancement levels remain unchanged. That is to say, only the coverage of CEL0 of uplink NPRACH resource of non-anchor carrier is reduced: the shaded part in FIG. 6 is mapped to CEL0 and is automatically adjusted to CEL1. The effect is equivalent to introducing a new CEL threshold for the uplink of the non-anchor carrier, that is, the RSRP threshold of the uplink judgment CEL of the non-anchor carrier is adjusted to (RSRP Threshold Configured, RSRP threshold for CEL2).

FIG. 7 shows another method for adjustment. As shown in FIG. 7, when the measured value of RSRP is less than the RSRP threshold of the uplink coverage decision of the non-anchor carrier, the coverage enhancement level decided by comparing the measured value of RSRP with the RSRP thresholds of coverage enhancement levels (i.e., RSRP threshold for CEL1, and RSRP threshold for CEL2) is increased by one (1), or the coverage enhancement level is determined to be the maximum coverage enhancement level. That is, if the coverage enhancement level decided by comparing the measured value of RSRP with the RSRP thresholds of coverage enhancement levels (i.e., RSRP threshold for CEL1, and RSRP threshold for CEL2) is CEL0, then the resource corresponding to CEL1 of the coverage enhancement level of the non-anchor carrier is automatically selected; or if CEL1/CEL2 is decided, then resource corresponding to CEL2 of the coverage enhancement level of the non-anchor carrier is automatically selected. The effect is equivalent to introducing a new CEL threshold for the uplink of the non-anchor carrier, that is, the RSRP threshold of the uplink judgment CEL of the non-anchor carrier is adjusted to (RSRP Threshold Configured, RSRP threshold for CEL1).

When the times of attempt for random access of NPRACH resources based on the selected coverage enhancement level reaches the maximum number of times such that the coverage enhancement level shall increase, the NPRACH resource corresponding to the maximum coverage enhancement level is selected directly. Alternatively, when the coverage enhancement level does not reach the maximum coverage level, the coverage enhancement level of the anchor/non-anchor carriers simultaneously increases by one level (the coverage enhancement level is increased by one). Then, a carrier and the NPRACH resource are selected according to the method as discussed above.

In an embodiment of the present disclosure, the newly introduced RSRP threshold of uplink coverage decision (RSRP Threshold Configured) of non-anchor carriers can also be the threshold configured for uplink NPRACH carriers, that is, an RSRP threshold of uplink coverage decision (RSRP Threshold Configured) is configured for each NPRACH carrier. Then the UE judges the CEL of each NPRACH carrier according to the method as discussed above.

The thresholds configured for the UE (including the first RSRP, the second RSRP and the third RSRP) described in the present disclosure means that the relevant threshold parameter values provided by a base station to the UE through a broadcast message.

Figure 8:
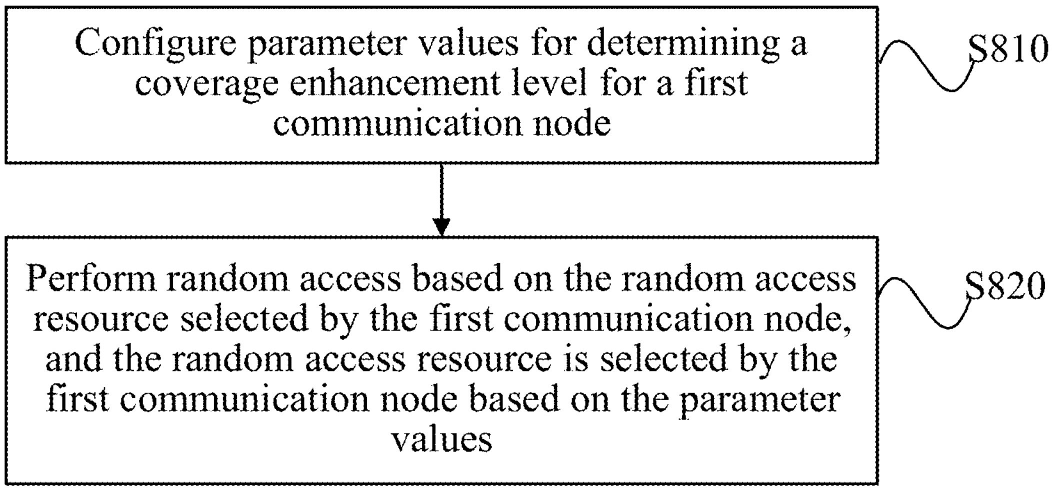
FIG. 8 depicts a flowchart showing a method for random access according to an embodiment of the present disclosure.

According to an embodiment, a method for random access is provided. FIG. 8 depicts a flowchart showing the method. The method can be applied to the case of random access based on the random-access resources selected by the first communication node. The random-access resources selected by the first communication node are determined based on the parameter values configured by the second communication node. The method can be performed by an apparatus for random access according to an embodiment. The apparatus can be implemented by one or more of software and hardware, and can be integrated onto the second communication node. For details of this embodiment that are not detailed, please refer to the above-mentioned embodiment, and do not repeat them here.

According to an embodiment, a method for random access is provided. As shown in FIG. 8, the method includes the following operations.

At operation S810, parameter values are configured for determining a coverage enhancement level for a first communication node.

In an embodiment, the parameter values include: NRS power offset, threshold of the second coverage enhancement level, or threshold of uplink coverage decision.

At operation S820, random access is performed based on the random-access resource selected by the first communication node, and the first communication node selects the random-access resource based on the parameter values.

In the method for random access according to an embodiment, the second communication node configures the parameter values for the first communication node, and then performs random access based on the random-access resource selected by the first communication node, thereby improving the random access efficiency.

Figure 9:
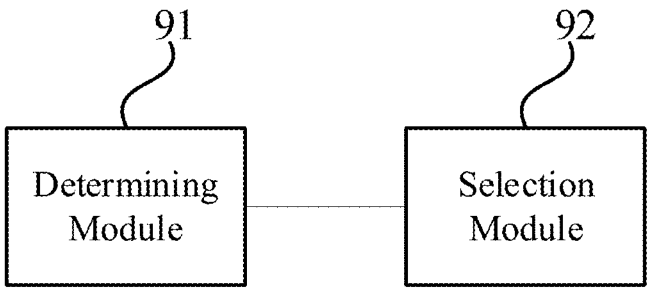
FIG. 9 depicts a schematic diagram showing a device for determining a random-access resource according to an embodiment of the present disclosure.

According to an embodiment, a device for determining a random-access resource is provided. FIG. 9 depicts a schematic diagram showing the device. In an embodiment, the device is integrated into the first communication node. As shown in FIG. 9, the device includes:

a determining module 91, configured to determine a coverage enhancement level of a carrier of the first communication node; and to determine a target coverage enhancement level based on the determined coverage enhancement level; and a selection module 92, configured to select a carrier according to the target coverage enhancement level; and to select a random-access resource on the selected carrier based on the coverage enhancement level of the selected carrier.

The device for determining a random-access resource according to this embodiment is configured to carry out the method for determining a random-access resource in the embodiment shown in FIG. 1, with similar scheme and technical effects, and which will not be repeated here.

On the basis of the above embodiments, variant embodiments of the above embodiments are proposed. It should be noted that, only the differences from the above embodiments are described in the variant embodiments for brevity of description.

In an embodiment, the determining of the coverage enhancement level of the carrier by the determining module 91, includes:

determining the coverage enhancement level of the carrier according to the RSRP value of the carrier and the first RSRP threshold of the coverage enhancement level.

The first RSRP threshold includes a threshold of a first coverage enhancement level and a threshold of a second coverage enhancement level. The threshold of the first coverage enhancement level is greater than the threshold of the second coverage enhancement level.

In an embodiment, the carriers include one anchor carrier, and at least one non-anchor carrier each having an identical or different narrowband reference signal (NRS) power offset from one another, with respect to the anchor carrier. The RSRP value of a non-anchor carrier is determined as discussed below.

According to the RSRP value of the anchor carrier and the narrowband reference signal NRS power offset of the non-anchor carrier relative to the anchor carrier. In one embodiment, the selecting of the carrier according to the target coverage enhancement level by the selection module 92, includes:

selecting a carrier from a set of carriers configured with random access resources corresponding to the target coverage enhancement level. The target coverage enhancement level is the coverage enhancement level of an anchor carrier or the lowest coverage enhancement level among coverage enhancement levels of all carriers.

In an embodiment, the determining of the coverage enhancement level of the carrier by the determining module 91, includes:

determining the coverage enhancement level of the non-anchor carrier according to the RSRP value of the anchor carrier and the second RSRP threshold of the coverage enhancement level.

In an implementation, the second RSRP threshold includes a threshold of the first coverage enhancement level, a threshold of the second coverage enhancement level, and a threshold of the third coverage enhancement level. The level values of the third coverage enhancement level are lower than the level value of the first coverage enhancement level which is in turn lower than the level value of the second coverage enhancement level. Each non-anchor carrier corresponds to a respective threshold of the third coverage enhancement level. Alternatively, all non-anchor carriers correspond to a threshold of the third coverage enhancement level. The threshold of the third coverage enhancement level is lower than the threshold of the first coverage enhancement level which is in turn lower than the threshold of the second coverage enhancement level.

In an embodiment, when the coverage enhancement level of a non-anchor carrier is determined not to be the third coverage enhancement level based on the threshold of the third coverage enhancement level, and the coverage enhancement level of the non-anchor carrier is determined to be the third coverage enhancement level based on the threshold of the first coverage enhancement level, the coverage enhancement level of the non-anchor carrier is adjusted.

In an embodiment, adjusting the coverage enhancement level of the non-anchor carrier includes:

adjusting the coverage enhancement level of the non-anchor carrier to be the first coverage enhancement level.

In an embodiment, the selected carrier is selected from the set of carriers determined by the target coverage enhancement level that is the lowest coverage enhancement level among coverage enhancement levels of all carriers.

In an embodiment, the determining of the coverage enhancement level of each carrier by the determining module 91, includes:

determining the coverage enhancement level of the non-anchor carrier according to the RSRP value of the anchor carrier and the third RSRP threshold of the coverage enhancement level.

The third RSRP threshold includes a threshold of a first coverage enhancement level, a threshold of a second coverage enhancement level and a threshold of an uplink coverage decision. The threshold of the uplink coverage decision is utilized to determine the coverage enhancement level of a non-anchor carrier. The threshold of the uplink coverage decision is lower than the threshold of the first coverage enhancement level which is in turn lower than the threshold of the second coverage enhancement level.

In an embodiment, when the coverage enhancement level of a non-anchor carrier is determined not to be the third coverage enhancement level based on the threshold of the uplink coverage decision, and the coverage enhancement level of the non-anchor carrier is determined to be the third coverage enhancement level based on the threshold of the first coverage enhancement level, the coverage enhancement level of the non-anchor carrier is adjusted.

In an embodiment, adjusting the coverage enhancement level of the non-anchor carrier includes:

adjusting the coverage enhancement level of the non-anchor carrier to be the first coverage enhancement level.

In an embodiment, when the coverage enhancement level of a non-anchor carrier is determined not to be the third coverage enhancement level based on the threshold of the uplink coverage decision, and the coverage enhancement level of the non-anchor carrier is determined based on the threshold of the first coverage enhancement level or the threshold of the second coverage enhancement level, the coverage enhancement level of the non-anchor carrier is adjusted.

In an embodiment, adjusting the coverage enhancement level of the non-anchor carrier includes:

increasing the coverage enhancement level of the non-anchor carrier by a preset number of levels; or, adjusting the coverage enhancement level of the non-anchor carrier to the maximum coverage enhancement level of the random-access resource configured by a cell.

In an embodiment, the device further includes a judgment module, which is configured to:

in response to the number of times for random access based on the selected random-access resource being greater than or equal to a preset threshold, select the random-access resource on the carrier with the largest coverage enhancement level; or, after adjusting the coverage enhancement level of each carrier, continue the carrier selection.

Figure 10:
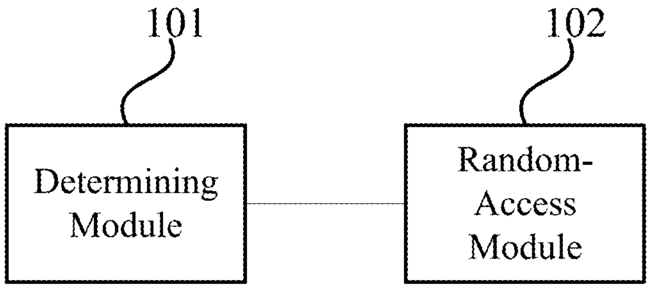
FIG. 10 depicts a schematic diagram of a device for random access according to an embodiment of the present disclosure.

According to an embodiment, a device for random access is provided. The device is integrated into the second communication node. FIG. 10 depicts a schematic diagram showing the device for random access. As shown in FIG. 10, the device includes:

a determining module 101, configured to configure a parameter value for determining a coverage enhancement level for a first communication node; and a random access module 102, configured to perform random access based on a random access resource selected by the first communication node based on the parameter value.

In an embodiment, the parameter values include: NRS power offset, threshold of the second coverage enhancement level, or threshold of uplink coverage decision.

The device for random access according to this embodiment is configured to carry out the method for random access in the embodiment shown in FIG. 8, with similar scheme and technical effects, and which will not be repeated here.

Figure 11:
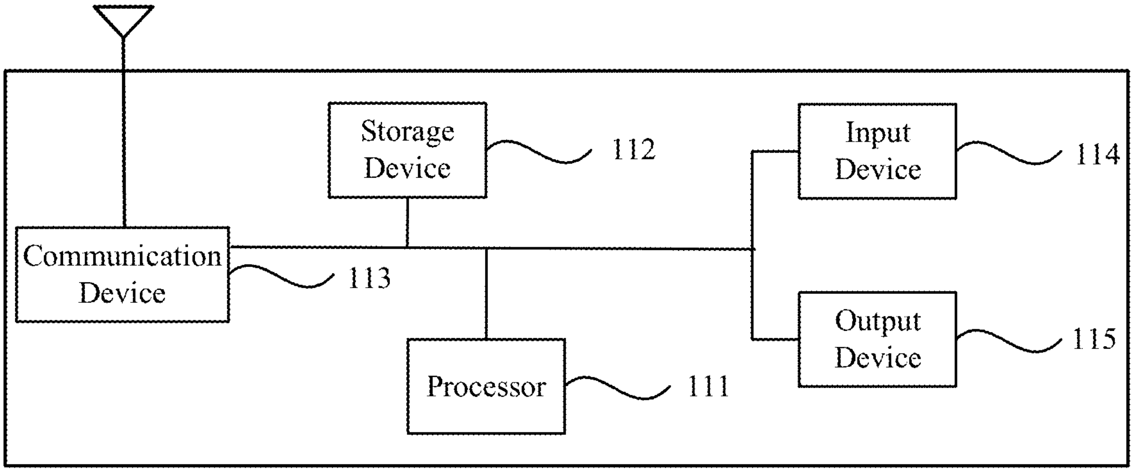
FIG. 11 depicts a schematic diagram showing a first communication node according to an embodiment of the present disclosure.

According to an embodiment, a first communication node is provided. FIG. 11 depicts a schematic diagram showing the first communication node. As shown in FIG. 11, the first communication node includes at least one processor 111 and a storage device 112. FIG. 11 shows one processor 111 by way of example. The storage device 112 is configured to store at least one program thereon which, when executed by the at least one processor 111, causes the at least one processor 111 to carry out the method for determining a random-access resource as described in any one embodiment of the present disclosure.

The first communication node further includes a communication device 113, an input device 114, and an output device 115.

The processor 111, the storage device 112, the communication device 113, the input device 114 and the output device 115 in the first communication node can be connected by a bus or other means. The connection is shown as a bus by way of an example in FIG. 11.

The input device 114 may be configured to receive input numeric or character information and generate key-pressing signal input related to user settings and function control of the first communication node. The output device 115 may include a display device such as a screen.

The communication device 113 may include a receiver and a transmitter. The communication device 113 is configured to receive and transmit information for communication under the control of the processor 111. The information includes but is not limited to random access resources.

As a computer-readable storage medium, the storage device 112 may be configured to store software programs, computer-executable programs and modules, such as program instructions/modules corresponding to the method for determining a random access resource as described in any one of the embodiments of the present disclosure, such as the determining module 91, and the selection module 92 in the device for determining a random access resource. The storage device 112 may include a program storage section and a data storage section, in which the program storage section may store an operating system and application programs for performing at least one operation, and data storage section may store data created according to the operation of the first communication node, or the like. In addition, the storage device 112 can include a high-speed random access memory and a nonvolatile memory, such as at least one disk memory device, a flash memory device, or other nonvolatile solid-state memory devices. In some implementations, the storage device 112 may further include memory remotely arranged with respect to the processor 111, and the remote memory may be connected to the first communication node through a network. Examples of the above networks include, but are not limited to, the Internet, intranet, local area network, mobile communication network, and combinations thereof.

Figure 12:
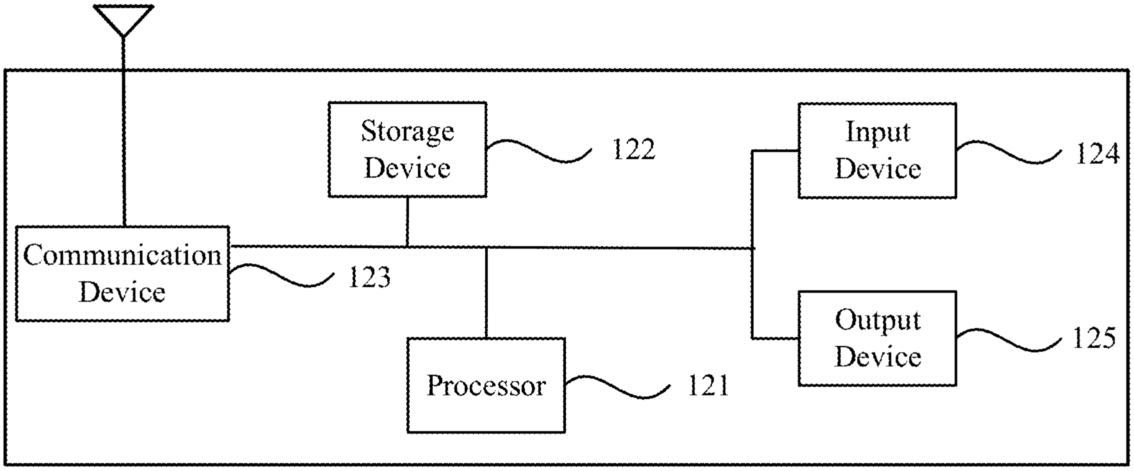
FIG. 12 depicts a schematic diagram showing a second communication node according to an embodiment of the present disclosure.

According to an embodiment, a second communication node is provided. FIG. 12 depicts a schematic diagram showing the second communication node. As shown in FIG. 12, the second communication node includes at least one processor 121 and a storage device 122. FIG. 12 shows one processor 121 by way of example. The storage device 122 is configured to store at least one program thereon which, when executed by the processor 121, causes the processor 121 to carry out the method for random access as described in any one embodiment of the present disclosure.

The second communication node further includes a communication device 123, an input device 124, and an output device 125.

The processor 121, the storage device 122, the communication device 123, the input device 124 and the output device 125 in the second communication node can be connected by a bus or other means. The connection is shown as a bus by way of an example in FIG. 12.

The input device 124 may be configured to receive input numeric or character information and generate key-pressing signal input related to user settings and function control of the second communication node. The output device 125 may include a display device such as a screen.

The communication device 123 may include a receiver and a transmitter. The communication device 123 is configured to receive and transmit information for communication under the control of the processor 121. The information includes but is not limited to a parameter value.

As a computer-readable storage medium, the storage device 122 may be configured to store software programs, computer-executable programs and modules, such as program instructions/modules corresponding to the method for random access as described in any one of the embodiments of the present disclosure, such as the determining module 101, and the random-access module 102 in the device for random access. The storage device 122 may include a program storage section and a data storage section, in which the program storage section may store an operating system and application programs for performing at least one operation, and data storage section may store data created according to the operation of the second communication node, or the like. In addition, the storage device 122 can include a high-speed random access memory and a nonvolatile memory, such as at least one disk memory device, a flash memory device, or other nonvolatile solid-state memory devices. In some implementations, the storage device 122 may further include memory remotely arranged with respect to the processor 121, and the remote memory may be connected to the second communication node through a network. Examples of the above networks include, but are not limited to, the Internet, intranet, local area network, mobile communication network, and combinations thereof.

According to an embodiment, a storage medium is provided. The storage medium stores a computer program which, when executed by a processor, causes the processor to carry out the method described in any one embodiment of the present disclosure. The method for determining random access resource includes, determining a coverage enhancement level for each of at least one carrier of the first communication node;

determining a target coverage enhancement level based on the determined coverage enhancement level;

selecting a carrier from the at least one carrier according to the target coverage enhancement level; and selecting the random-access resource on the selected carrier based on the coverage enhancement level of the selected carrier.

When the computer program is executed by a processor, the processor is caused to perform the method for random access as described in any embodiment of the present disclosure. The method for random access includes, configuring a parameter value for determining a coverage enhancement level for a first communication node; and performing random access based on a random-access resource selected by the first communication node, where the first communication node selects the random access resource based on the parameter value.

The computer storage medium in an embodiment of the present disclosure can take the form of any combination of one or more computer-readable medium. The computer-readable medium can be a computer-readable signal medium or a computer-readable storage medium. The computer readable storage media can be, for example, but is not limited to: systems, apparatus, or devices of electricity, magnetism, optical, electromagnetism, infrared, or semiconductors, or any combination of the above. More specific examples of computer-readable storage media (non-exhaustive list) include: electrical connections with one or more wires, portable computer disks, hard drives, Random Access Memory (RAM), Read Only Memory (ROM), Erasable Programmable Read Only Memory (EPROM), flash memory, fiber optic, portable CD-ROM, optical storage devices, magnetic storage devices, or any suitable combination of the above. The computer-readable storage medium can be any tangible medium that contains or stores a program, which can be used by or in combination with an instruction execution system, apparatus, or device.

The computer-readable signal medium can include data signals propagated in the baseband or as part of the carrier wave, which carry computer-readable program code. This type of transmitted data signal can take various forms, including but not limited to electromagnetic signals, optical signals, or any suitable combination of the above. The computer-readable signal medium can also be any computer-readable medium other than a computer-readable storage medium, which can send, propagate, or transmit programs used by or in combination with instruction execution systems, apparatus, or devices.

The program code contained on computer readable media can be transmitted using any suitable medium, including but not limited to: wireless, wire, optical cable, Radio Frequency (RF), etc., or any suitable combination of the above.

Computer program code for executing the operations of the present disclosure may be written in one or more programming languages or combinations thereof, including object-oriented programming languages such as Java, Smalltalk, C++, and conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In terms of remote computers, remote computers can connect to user computers through any type of network, including a local area network (LAN) or wide area network (WAN), or can connect to external computers (such as utilizing an Internet service provider to connect through the Internet).

Described above are some embodiments which are illustrative and are not intended to limit the present disclosure.

It should be understood by those having ordinary skills in the art that the term user equipment covers any suitable type of wireless user equipment, such as a mobile phone, a portable data processing device, a portable web browser, or a vehicle-mounted mobile station.

Generally, various embodiments of the present disclosure may be implemented as hardware or dedicated circuits, software, logic or any suitable combination thereof. For example, some aspects may be implemented as hardware, while other aspects may be implemented as firmware or software executable by a controller, microprocessor or other computing device, although the present disclosure is not limited thereto.

Some embodiments of the present disclosure can be implemented by a data processor of a mobile device executing computer program instructions, for example, in a processor entity, or by hardware, or by a combination of software and hardware. Computer program instructions can be assembly instructions, instruction set architecture (ISA) instructions, machine instructions, machine-related instructions, microcode, firmware instructions, state setting data, or source code or object code written in any combination of one or more programming languages.

The block diagram of any logic flow in the drawings of the present disclosure may represent program process, or may represent interconnected logic circuits, modules and functions, or may represent the combination of program process and logic circuits, modules and functions. Computer programs can be stored in the memory. The memory can be of any type suitable for the local technical environment and can be realized with any suitable data storage technology, such as, but not limited to, read-only memory (ROM), random access memory (RAM), optical memory devices and systems like Digital Video Disc (DVD), or Compact Disk (CD) etc. Computer-readable media may include non-transitory storage media. The data processor can be of any type suitable for the local technical environment, such as but not limited to a general-purpose computer, a special-purpose computer, a microprocessor, a digital signal processor (DSP), an application-specific integrated circuit (ASIC), a field programmable gate array (FGPA) and a processor based on a multi-core processor architecture.

Some embodiments of the present disclosure are illustrated above by way of non-limiting implementations. However, various modifications and alternations to the above embodiments are apparent to those having ordinary skills in the art when considering the drawings and claims, without departing from the scope of the present disclosure. Therefore, the proper scope of the present disclosure should be defined by claims.

What is claimed is:

1. A method for determining a random-access resource, which is applied to a first communication node, the method comprising:

determining at least one coverage enhancement level for at least one carrier of the first communication node, with each of the at least one coverage enhancement level corresponding to a respective one of the at least one carrier;

determining a target coverage enhancement level based on the determined at least one coverage enhancement level;

selecting a carrier from the at least one carrier according to the target coverage enhancement level; and selecting the random-access resource on the selected carrier based on the coverage enhancement level of the selected carrier;

wherein determining the at least one coverage enhancement level for the at least one carrier comprises:

determining the coverage enhancement level for one of the at least one carrier according to a Reference Signal Receiving Power (RSRP) value of the one of the at least one carrier and first RSRP thresholds for coverage enhancement levels; wherein, the first RSRP thresholds comprise a threshold of a first coverage enhancement level and a threshold of a second coverage enhancement level; and the threshold of the first coverage enhancement level is greater than the threshold of the second coverage enhancement level.

2. The method according to claim 1, wherein the at least one carrier comprises one anchor carrier, and at least one non-anchor carrier each having an identical or different narrowband reference signal (NRS) power offset from one another, with respect to an NRS power of the anchor carrier; and the RSRP value of each of the at least one non-anchor carrier is determined according to the RSRP value of the anchor carrier and the NRS power offset of the respective one of the at least one non-anchor carrier with respect to the NRS power of the anchor carrier.

3. The method according to claim 1, wherein the at least one carrier comprises one anchor carrier, and at least one non-anchor carrier, determining at least one coverage enhancement level for at least one carrier comprises, determining a plurality of coverage enhancement levels for the anchor carrier and the at least one non-anchor carrier;

and selecting the carrier from the at least one carrier according to the target coverage enhancement level comprises:

forming a set of carriers each configured with random access resources corresponding to the target coverage enhancement level, from the at least one carrier, and selecting the carrier from the set of carriers; wherein the target coverage enhancement level is the coverage enhancement level of the anchor carrier or a lowest coverage enhancement level among the plurality of coverage enhancement levels.

4. The method according to claim 1, wherein the at least one carrier comprises one anchor carrier and at least one non-anchor carrier, and determining the at least one coverage enhancement level for the at least one carrier comprises:

determining the coverage enhancement level of the at least one non-anchor carrier according to the RSRP value of the anchor carrier and second RSRP thresholds of the coverage enhancement levels; wherein, the second RSRP thresholds comprise a threshold of the first coverage enhancement level, a threshold of the second coverage enhancement level, and a plurality of thresholds of the third coverage enhancement level; each level value of the third coverage enhancement levels is lower than the level value of the first coverage enhancement level which is in turn lower than the level value of the second coverage enhancement level; each of the at least one non-anchor carrier corresponds to a respective one of the plurality of thresholds of the third coverage enhancement level; or, each of the at least one non-anchor carrier corresponds to a same one of the plurality thresholds of the third coverage enhancement level; each of the plurality of thresholds of the third coverage enhancement level is lower than the threshold of the first coverage enhancement level which is in turn lower than the threshold of the second coverage enhancement level.

5. The method according to claim 4, wherein, in response to: a determination of the coverage enhancement level of a respective non- anchor carrier of the at least one non-anchor carrier being a non-third coverage enhancement level based on the respective one of the plurality of thresholds of the third coverage enhancement level corresponding to the respective non-anchor carrier, and the determination of the coverage enhancement level of the respective non-anchor carrier to be a third coverage enhancement level based on the threshold of the first coverage enhancement level, adjusting the coverage enhancement level of the respective non-anchor carrier.

6. The method according to claim 5, wherein adjusting the coverage enhancement level of the respective non-anchor carrier comprises:

adjusting the coverage enhancement level of the respective non-anchor carrier to be the first coverage enhancement level.

7. The method according to claim 4, wherein the selected carrier is selected from a set of carriers determined by the target coverage enhancement level, determining at least one coverage enhancement level for at least one carrier comprises, determining a plurality of coverage enhancement levels for the anchor carrier and the at least one non-anchor carrier;

and the target coverage enhancement level is the lowest coverage enhancement level among the plurality of coverage enhancement levels.

8. A method for determining a random-access resource, which is applied to a first communication node, the method comprising:

determining at least one coverage enhancement level for at least one carrier of the first communication node, with each of the at least one coverage enhancement level corresponding to a respective one of the at least one carrier;

determining a target coverage enhancement level based on the determined at least one coverage enhancement level;

selecting a carrier from the at least one carrier according to the target coverage enhancement level; and selecting the random-access resource on the selected carrier based on the coverage enhancement level of the selected carrier;

wherein the at least one carrier comprises one anchor carrier and at least one non-anchor carrier, and determining the at least one coverage enhancement level for the at least one carrier comprises:

determining the coverage enhancement level of one of the at least one non-anchor carrier according to the RSRP value of the anchor carrier and a third RSRP threshold of the coverage enhancement level; wherein, the third RSRP threshold comprises a threshold of a first coverage enhancement level, a threshold of a second coverage enhancement level and a threshold of an uplink coverage decision; the threshold of the uplink coverage decision is utilized to determine the coverage enhancement level of the one of the at least one non-anchor carrier; and the threshold of the uplink coverage decision is lower than the threshold of the first coverage enhancement level which is in turn lower than the threshold of the second coverage enhancement level.

9. The method according to claim 8, wherein, in response to: a determination of the coverage enhancement level of the one of the at least one non-anchor carrier being a non-third coverage enhancement level based on the threshold of the uplink coverage decision, and a further determination of the coverage enhancement level of the one of the at least one non-anchor carrier to be a third coverage enhancement level based on the threshold of the first coverage enhancement level, adjusting the coverage enhancement level of the one of the at least one non-anchor carrier.

10. The method according to claim 9, wherein adjusting the coverage enhancement level of the one of the at least one non-anchor carrier comprises:

adjusting the coverage enhancement level of the one of the at least one non-anchor carrier to be the first coverage enhancement level.

11. The method according to claim 8, wherein, in response to: a determination that the coverage enhancement level of the one of the at least one non-anchor carrier is a non-third coverage enhancement level based on the threshold of the uplink coverage decision, and to a determination of the coverage enhancement level of the one of the at least one non-anchor carrier based on the threshold of the first coverage enhancement level or the threshold of the second coverage enhancement level, adjusting the coverage enhancement level of the one of the at least one non-anchor carrier.

12. The method according to claim 10, wherein adjusting the coverage enhancement level of the one of the at least one non-anchor carriers comprises:

increasing the coverage enhancement level of the one of the at least one non-anchor carrier by a preset number of levels; or, adjusting the coverage enhancement level of the one of the at least one non-anchor carrier to the maximum coverage enhancement level of the random-access resource configured by a cell.

13. The method according to claim 1, further comprising:

in response to the number of times of attempts for random access based on the selected random-access resource being greater than or equal to a preset threshold, select the random- access resource on the carrier with the largest coverage enhancement level; or, after adjusting the coverage enhancement level of each carrier, continue the carrier selection.

14. A method for random access, applied to a second communication node, the method comprising:

configuring a parameter value for determining a coverage enhancement level for a first communication node; and performing random access based on a random-access resource selected by the first communication node; wherein the random-access resource is selected by the first communication node based on the parameter value;

wherein the parameter value is one of a plurality of parameter values comprising a Narrowband Reference Signal (NRS) power offset, and a threshold of a second coverage enhancement level or a threshold of an uplink coverage decision.

15. A first communication node, comprising:

at least one processor; and a storage device configured to store at least one program which, when executed by the at least one processor, causes the at least one processor to carry out the method according to claim 1.

16. A second communication node, comprising:

at least one processor; and a storage device configured to store at least one program which, when executed by the at least one processor, causes the at least one processor to carry out the method according to claim 14.

17. A non-transitory storage medium storing at least one computer program which, when executed by a processor, causes the processor to carry out the method according to claim 1.

18. A non-transitory storage medium storing at least one computer program which, when executed by a processor, causes the processor to carry out the method according to claim 8.

19. A non-transitory storage medium storing at least one computer program which, when executed by a processor, causes the processor to carry out the method according to claim 14.

* * * * *